United States Patent
Neumann et al.

(10) Patent No.: US 7,296,932 B2
(45) Date of Patent: Nov. 20, 2007

(54) FLUID DYNAMIC BEARING HAVING AN ACUTE-ANGLED SHAFT RECESS

(75) Inventors: Rudolf Neumann, Spaichingen (DE); Guido Schmid, Triberg (DE)

(73) Assignee: Minebea Co. Ltd, Nagano (JP)

( * ) Notice: Subject to any disclaimer, the term of this patent is extended or adjusted under 35 U.S.C. 154(b) by 839 days.

(21) Appl. No.: 10/348,090

(22) Filed: Jan. 20, 2003

(65) Prior Publication Data

US 2004/0141667 A1 Jul. 22, 2004

(51) Int. Cl.
*F16C 33/74* (2006.01)
*F16C 32/06* (2006.01)

(52) U.S. Cl. .................................. 384/130; 384/100

(58) Field of Classification Search ........... 384/100, 384/107, 113, 114, 115, 119, 120, 130, 132
See application file for complete search history.

(56) References Cited

U.S. PATENT DOCUMENTS

| | | | | |
|---|---|---|---|---|
| 3,778,123 A * | 12/1973 | Hendler et al. | ............. | 384/132 |
| 5,457,588 A | 10/1995 | Hattori et al. | | |
| 5,765,952 A * | 6/1998 | Dekker et al. | ............. | 384/132 |
| 5,791,784 A * | 8/1998 | Ichiyama | .................... | 384/107 |
| 5,810,480 A | 9/1998 | Asada et al. | | |
| 5,879,084 A * | 3/1999 | Ichiyama | .................... | 384/107 |
| 6,036,369 A | 3/2000 | Ichiyama | | |
| 6,066,903 A | 5/2000 | Ichiyama | | |
| 6,196,722 B1 | 3/2001 | Asada et al. | | |
| 6,216,630 B1 | 4/2001 | Ogawa et al. | | |
| 6,246,136 B1 * | 6/2001 | Ichiyama | .................... | 310/90 |
| 6,357,916 B2 | 3/2002 | Saeki et al. | | |
| 6,467,963 B2 | 10/2002 | Sakuragi et al. | | |
| 6,733,180 B2 * | 5/2004 | Nakamura | .................. | 384/100 |
| 6,828,709 B2 * | 12/2004 | Grantz et al. | ................. | 310/90 |
| 7,048,444 B2 * | 5/2006 | Kurimura et al. | ........... | 384/119 |
| 7,063,462 B2 * | 6/2006 | Aiello et al. | ................. | 384/107 |
| 2002/0173431 A1 * | 11/2002 | Hirata | ........................ | 508/107 |
| 2003/0002757 A1 * | 1/2003 | Hajota et al. | ............... | 384/114 |
| 2003/0091249 A1 * | 5/2003 | Kurimura et al. | ........... | 384/100 |

FOREIGN PATENT DOCUMENTS

JP 2937833 B2 8/1999

* cited by examiner

*Primary Examiner*—Thomas R. Hannon
*Assistant Examiner*—Justin Krause
(74) *Attorney, Agent, or Firm*—Joel E. Lutzker, Esq.; John C. Garces, Esq.; Schulte Roth & Zabel LLP

(57) ABSTRACT

A fluid dynamic bearing assembly including a shaft and a bearing sleeve. A bearing gap is formed between the shaft and the bearing sleeve and is filled with a lubricating fluid. A capillary seal is formed at one end of the bearing sleeve, and a recess is formed in the shaft immediately above the capillary seal. The surface of the recess forms an acute angle with an axis of the shaft.

3 Claims, 3 Drawing Sheets

FLUID DYNAMIC BEARING HAVING AN ACUTE-ANGLED SHAFT RECESS

FIELD OF THE INVENTION

The present invention generally relates to a spindle motor. More specifically, the invention relates to a spindle motor utilizing a fluid dynamic pressure bearing to support a rotating shaft within a bearing portion, the rotating shaft being surrounded by lubricating oil enclosed in the bearing portion.

BACKGROUND

In recent years, there was an increase in demand for smaller size and lighter weight spindle motors. There was also an increase in demand for higher density of memory capacity in data recording devices such as magnetic disks and optical disks used in computers. These developments led to an increased demand for technologies increasing motors' rpm speed and improving rotation accuracies in spindle motors used to rotate such disks.

To address this demand with respect to bearings used to support rotating shafts in data storage devices, there has been an increasing trend away from conventional ball bearings toward the adoption of fluid dynamic pressure bearings. Fluid dynamic pressure bearings support a rotating shaft by generating a fluid dynamic pressure within lubricating fluid, for example oil or air, when the shaft is rotated.

Fluid dynamic pressure bearings are well known in the art. Structures which employ fluid dynamic pressure bearings as bearings for spindle motor rotating shafts are also well known (see, for example, Japanese Patent No. 2937833). An example of a conventionally known fluid dynamic pressure bearing is shown as the conventional example in FIGS. 4(a)-(c).

As shown in FIGS. 4(a)-(c), a rotating shaft 31 is supported for rotation inside a bearing sleeve 32, thus defining the bearing portion. Lubricating oil is enclosed in the gap formed between the inner perimeter surface and bottom surface of bearing sleeve 32 and the outer surface of the rotating shaft. A radial fluid dynamic pressure-generating groove 33 is formed on the inner perimeter surface of the bearing portion of the bearing sleeve, while a thrust fluid dynamic pressure-generating groove 34 is formed on the bottom surface of bearing sleeve 32.

When shaft 31 rotates, the fluid dynamic pressure generated by radial fluid dynamic pressure-generating groove 33 and thrust fluid dynamic pressure-generating groove 34, in the radial and thrust directions, respectively, enables the rotating shaft to rotate in a suspended state inside the bearing sleeve, with a film of lubricating oil interposed therebetween.

During operation of the above described spindle motor, lubricating oil 12 enclosed in the gap 35 between rotating shaft 31 and sleeve 32 ascends to the opening surface at the top edge portion of sleeve 32. This oil ascending phenomenon may be caused by volumetric changes from temperature change-induced expansion and contraction of the lubricating oil, expansion displacement of the bearing dimensions, internal movement caused by the pumping effect at the start and stop of shaft's rotation or effects of centrifugal forces and dynamic pressure during rotation.

This type of ascending of the lubricating oil such that it reaches and overflows the opening surface of the bearing sleeve creates the problem of lubricating oil leakage. Leakage and depletion of the lubricating oil from the bearing sleeve results in insufficient fluid dynamic pressure, reduced lubrication, and, in some cases, burning through contact between the rotating shaft and the bearing sleeve. At the same time leaking lubricating oil can erase recordings on the magnetic disk.

As shown in FIGS. 4(a)-(c), a gap widening portion 37 having a tapered surface 36 may be provided at the upper portion of the bearing sleeve to prevent leakage of lubricating oil. Gap widening portion 37 gradually expands at a specified angle of inclination a, as measured between the inner surface of bearing sleeve 32 and the axis of the shaft at the gap opening edge area. Thus, the upper portion of the gap gradually widens in the direction of the opening surface. Further, as shown in FIG. 4(c), the bearing may also include a lubricating oil reservoir 38 disposed on the inner surface of bearing sleeve 32, specifically, on the inside of tapered surface 36.

As disclosed in the above-mentioned Japanese Patent No. 2937833, an oil collecting groove may be disposed on the inner surface of the bearing sleeve. A gap changing portion is also provided in the disclosed construction, wherein the gap expands towards the opening surface of the bearing sleeve. Taking a as the angle of gap's expansion towards the outside, an inner surface of the gap changing portion may be inclined at the angle $\alpha$ of 0° or greater. As is disclosed in the '833 patent, a gap inclination angle $\alpha$ of 0° indicates that it is acceptable to have a partial area of the gap changing portion being parallel to the rotating shaft.

In addition to having a gap widening seal portion provided on the sleeve, a shaft of the fluid dynamic bearing construction shown in FIG. 1 may be provided with a recess having an oil repellent film applied to its surface. Such recess prevents oil from splashing further out of the bearing gap, especially during the oil fill process, and causing damage. The conventional structure of the recess is more particularly shown in FIG. 3, where the conventional shaft recess is designated with a reference numeral 40. As shown in FIG. 3, the surface of the recess 40 forms a 90° angle with a shaft axis at the bottom and top portions of the recess (points A and B on FIG. 3). Accordingly, when oil is filled into the bearing gap and some of the oil is splashed into the shaft recess 40, some of the oil is collected at the bottom surface 40a, either at the edge or the corner of the recess, and has to be cleaned out by either wiping it out or vacuuming it out using a vacuum nozzle. However, it is difficult to remove the oil completely using either one of the above processes. Also, the necessity to remove the oil from the recess adds another step to the bearing assembly process and, therefore, increases the cost of the bearing.

Additionally, when an oil repellent film is applied to the surface of the recess 40, a caution must be exercised to prevent oil repellent from descending into the bearing gap filled with oil. Even a tiny amount of oil repellant can damage the fluid dynamic bearing assembly if the repellant descends into the bearing gap. Given the conventional shape of the recess, it is very difficult to apply the oil repellent film to the surface of the recess without dropping the repellant into the bearing gap. Also, when the repellant is applied to the conventional recess, drops of the repellant may collect in the recess pocket areas (points A and B in FIG. 3) and later slip into the bearing gap.

It is also difficult to apply the oil repellent film to the conventional recess evenly without missing any spots on the surface.

SUMMARY OF THE INVENTION

It is an object of the present invention to provide a fluid dynamic bearing having an oil repellent shaft recess wherein the shape of the oil recess facilitates removal of oil from the recess.

In the first aspect, the present invention provides a fluid dynamic bearing assembly including a shaft and a bearing sleeve. A bearing gap is formed between the shaft and the bearing sleeve and is filled with a lubricating oil. A capillary seal is formed at one end of the bearing sleeve, and a recess is formed in the shaft immediately above the capillary seal. The surface of the recess forms an acute angle with an axis of the shaft. An oil repellent film is applied to the surface of the recess to facilitate the removal of the oil from the recess.

The above advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION

Figure 1:
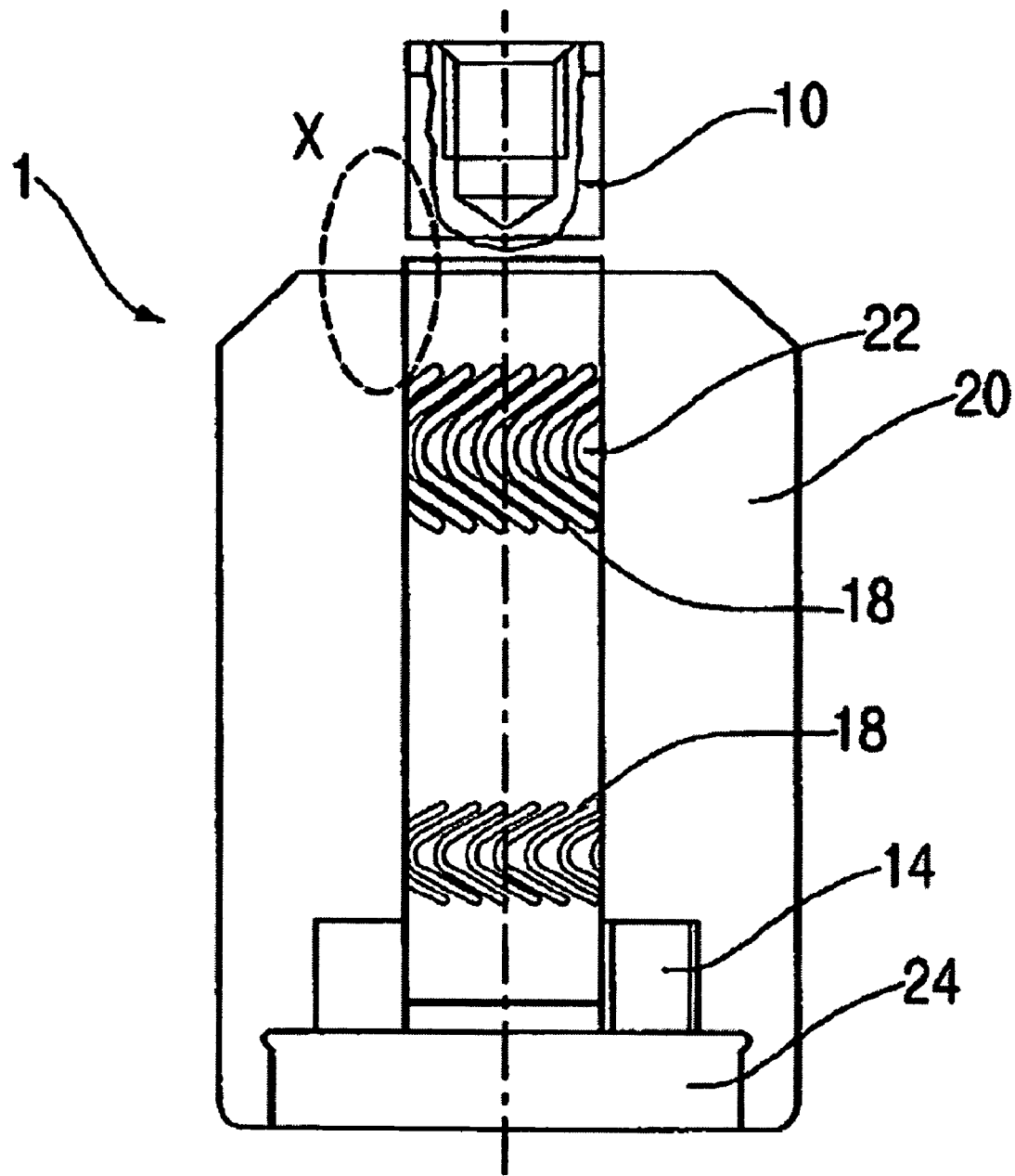
FIG. 1 is a cross-sectional view of a fluid dynamic bearing having a tapered sealing portion and a shaft recess portion.
Figure 3:
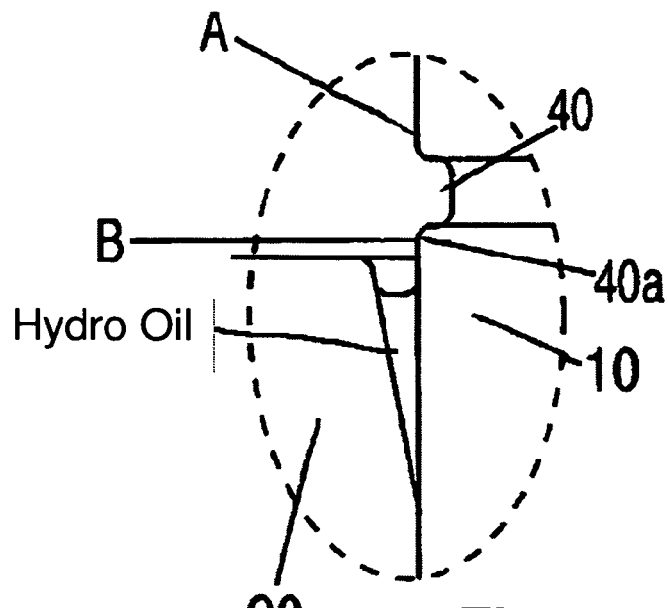
FIG. 3 is an enlarged view of area X shown in FIG. 1, showing a conventionally shaped shaft recess.

As shown in FIG. 1, the fluid dynamic bearing assembly 1 comprises a shaft 10 and a bearing sleeve 20. The bearing sleeve is provided with a cylindrical inner opening 22. The shaft is inserted into the cylindrical opening of the bearing sleeve 20 in such a way as to insure its free rotation with respect to the sleeve. Although the shaft 10 is shown as the rotational component of the assembly, it is to be appreciated by a person skilled in the art that the bearing sleeve may be the rotational component and the shaft may be constructed as a fixed component of the assembly. A thrust plate 14 is fixedly secured to the bottom of the shaft 10 so as to rotate with the shaft. One end of the cylindrical opening 22 is sealed with a counter plate 24. A bearing gap is formed between the shaft with the thrust plate and the bearing sleeve with the counter plate. The bearing gap is filled with a lubricating fluid, preferably oil.

Either the outer surface of the shaft or the inner surface of the bearing sleeve may be provided with radial dynamic pressure generating grooves 18. When the shaft 10 rotates with respect to the sleeve 20, grooves 18 generate a radial dynamic pressure in the lubricating oil, thus allowing the shaft to rotate without touching the inner surface of the bearing sleeve.

Either the bottom surface of the thrust plate 14 or the top surface of the counter plate 24 may be provided with a plurality of thrust dynamic pressure generating grooves (not shown). When the shaft 10 rotates with respect to the sleeve 20, thrust grooves generate thrust dynamic pressure in the lubricating oil, thus suspending the shaft above the counter plate and allowing the thrust plate to rotate without touching the counter plate.

A top portion of the cylindrical opening 22 is preferably provided with a capillary seal 26. The seal 26 may be provided with a tapered portion extending along the entire or partial surface of the seal. Any other conventionally known shape of the capillary seal may be used with the present invention. During shaft's rotation, as well as at the beginning and termination of the shaft's rotation, the seal prevents the oil from spilling out of the bearing gap. However, occasional splashing of oil may still occur during shocks and oil-filling process, when drops of oil can ascend the shaft and get into the environment.

Figure 2:
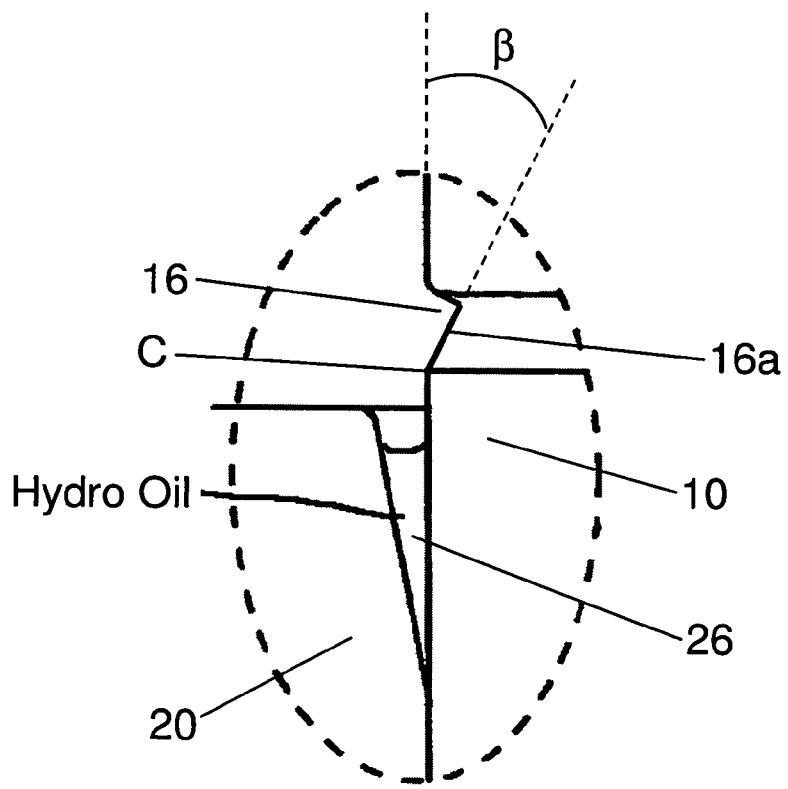
FIG. 2 is an enlarged view of area X shown in FIG. 1, showing a shaft recess constructed in accordance with an embodiment of the present invention.
Figure 4A:
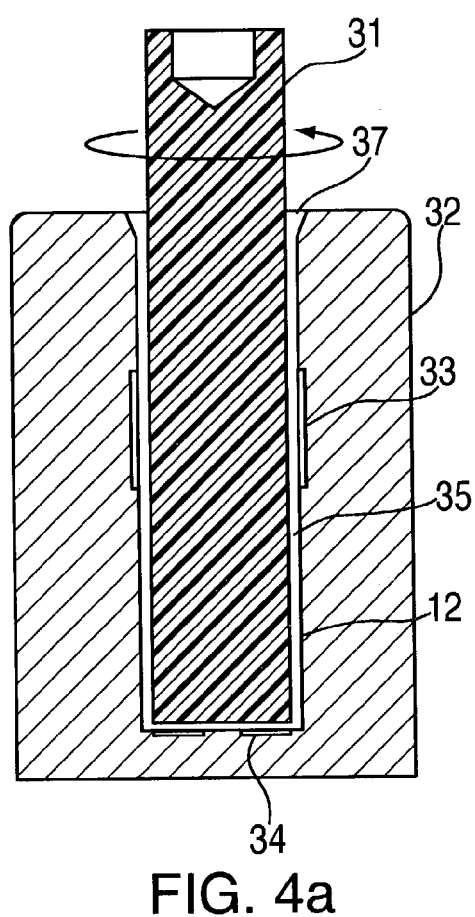
FIGS. 4a-c show cross-sectional view of a conventional fluid dynamic bearing.
Figure 4B:
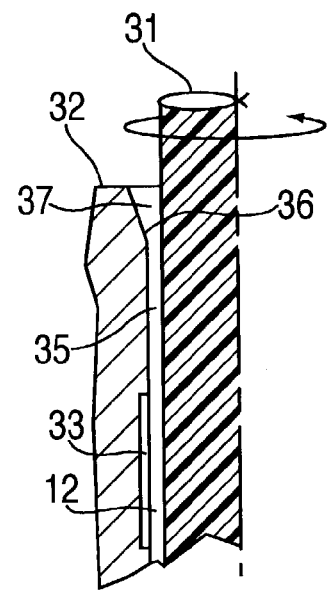
Figure 4C:
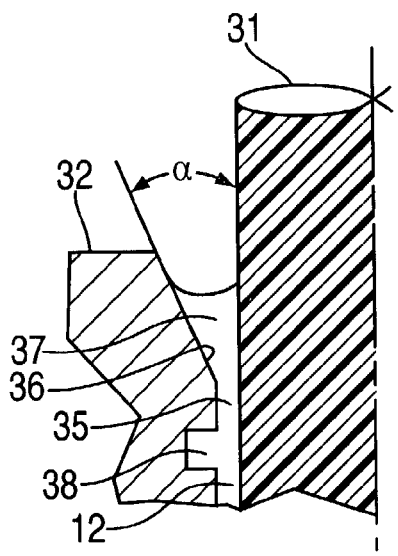

To prevent such splashing, a recess 16 is formed in the shaft 10 immediately above the top surface of the bearing sleeve 20 and its capillary seal 26, as more particularly shown in FIG. 2. The recess 16 has a wall surface 16a extending from the bottom of the recess (point C on FIG. 2). The wall surface 16a forms an acute angle $\beta$ (<90°) with the shaft's axis. In the preferred embodiment, the angle $\beta$ is less than 45°. When the oil is splashed into the recess 16, the acutely shaped form of its wall surface facilitates oil removal from the recess, such that the oil can easily flow back into the seal portion of the bearing gap without accumulating at the bottom of the recess.

An oil repellent film is preferably applied to the surface of the recess 16 to repel oil splashed into the recess during operation and oil-filling process. The provided shape of the recess 16 avoids the above described problem of allowing drops of repellant to accumulate on the surface of the recess and to descend into the bearing gap. Particularly, when the repellent film is applied to the surface of the recess, it is preferred that the shaft is turned upside down during this application. Therefore, the repellant is prevented by gravity from dripping into the bearing gap. Because there are no pocket areas formed in the bottom portion of the recess, no oil repellant drops can accumulate within this bottom portion. Therefore, when the shaft is turned back into its working position, there are no repellant drops on the recess surface and no such drops can drip into the bearing gap.

Additionally, it is very easy to apply the oil repellent film to the surface of the recess 16 because there are no pockets along its surface that would require additional time and effort to be entirely covered with oil repellant. The process is also improved because a worker applying the oil repellent film does not have to be excessively concerned with the repellant dripping into the bearing gap.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A fluid dynamic bearing assembly, comprising:
    a shaft;
    a bearing sleeve;
    a bearing gap formed between the shaft and the bearing sleeve;
    a lubricating fluid contained within the bearing gap;
    a capillary seal formed at a first end of the bearing sleeve; and a recess formed in the shaft above the capillary seal,
wherein the recess comprises an oil repellent film applied to its surface, and
wherein an inclined surface of the recess forms an acute angle with an axis of the shaft, wherein said recess is distinct and separate from said capillary seal, and wherein said shaft further comprises a straight portion located between said capillary seal and said recess.

2. The A fluid dynamic bearing assembly, comprising:

a shaft;

a bearing sleeve;

a bearing gap formed between the shaft and the bearing sleeve;

a lubricating fluid contained within the bearing gap;

a capillary seal formed at a first end of the bearing sleeve; and a recess formed in the shaft above the capillary seal, wherein an inclined surface of the recess forms an acute angle with an axis of the shaft, wherein said recess is distinct and separate from said capillary seal, and wherein said shaft further comprises a straight portion located between said capillary seal and said recess; and wherein an oil repellent film is applied at the top surface of the bearing sleeve.

3. A fluid dynamic bearing assembly, comprising:

a shaft;

a bearing sleeve;

a bearing gap formed between the shaft and the bearing sleeve;

a lubricating fluid contained within the bearing gap;

a capillary seal formed at a first end of the bearing sleeve; and a recess formed in the shaft above the capillary seal, wherein an inclined surface of the recess forms an acute angle with an axis of the shaft, wherein said recess is distinct and separate from said capillary seal, and wherein said shaft further comprises a straight portion located between said capillary seal and said recess; and wherein an oil repellent film is applied to the top of the tapered capillary seal.

* * * * *